United States Patent
Kahn et al.

(10) Patent No.: US 12,425,925 B2
(45) Date of Patent: Sep. 23, 2025

(54) TIME SENSITIVE COMMUNICATION QUALITY OF SERVICE ALTERNATIVES

(71) Applicant: Nokia Solutions and Networks Oy, Espoo (FI)

(72) Inventors: Colin Kahn, Morris Plains, NJ (US); Devaki Chandramouli, Plano, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 342 days.

(21) Appl. No.: 17/661,826

(22) Filed: May 3, 2022

(65) Prior Publication Data

US 2022/0361047 A1    Nov. 10, 2022

Related U.S. Application Data

(60) Provisional application No. 63/184,509, filed on May 5, 2021.

(51) Int. Cl.
*H04W 28/24* (2009.01)
*H04M 15/00* (2024.01)
(Continued)

(52) U.S. Cl.
CPC .......... *H04W 28/24* (2013.01); *H04M 15/66* (2013.01); *H04W 28/0268* (2013.01); *H04W 48/16* (2013.01)

(58) Field of Classification Search
CPC . H04W 28/24; H04W 28/0268; H04W 48/16; H04M 15/66
See application file for complete search history.

(56) References Cited

U.S. PATENT DOCUMENTS

| | | | |
|---|---|---|---|
| 10,568,061 B1 * | 2/2020 | Park | H04W 76/34 |
| 2019/0215731 A1 * | 7/2019 | Qiao | H04W 24/06 |

(Continued)

FOREIGN PATENT DOCUMENTS

| | | |
|---|---|---|
| CN | 111756555 A | 10/2020 |
| CN | 112437122 A | 3/2021 |

(Continued)

OTHER PUBLICATIONS

Extended European Search Report received for corresponding European Patent Application No. 22171720.0, dated Sep. 26, 2022, 13 pages.

(Continued)

*Primary Examiner* — James P Duffy
(74) *Attorney, Agent, or Firm* — Nokia Technologies Oy

(57) ABSTRACT

Methods, apparatuses, and computer program products provide for specifying, in quality of service (QoS) requests, alternative QoS-related parameter sets and/or alternative traffic pattern parameter sets. In the context of one method, the method receives a QoS request comprising one or more QoS parameters and/or one or more traffic pattern parameters, and one or more alternative QoS parameter sets and/or (Continued)

one and more alternative traffic pattern parameter sets. The method also selects the one or more QoS parameters or an alternative QoS parameter set of the one or more alternative QoS parameter sets based on a supporting capability of a network. The method also causes transmission of a Policy and Charging Control (PCC) rule based on the selected parameters and transmits an indication of the selected parameters.

12 Claims, 9 Drawing Sheets

(51) Int. Cl.
  *H04W 28/02* (2009.01)
  *H04W 48/16* (2009.01)

(56) References Cited

U.S. PATENT DOCUMENTS

2021/0105192 A1   4/2021  Kahn et al.
2021/0400146 A1*  12/2021 Muñoz De La Torre Alonso ....... H04M 15/66

FOREIGN PATENT DOCUMENTS

CN       112567714 A      3/2021
WO    WO-2020259793 A1 * 12/2020 ......... H04L 47/2491
WO       2021/028053 A1    2/2021

OTHER PUBLICATIONS

Terminology alignment: usage of "NF service consumer", 3GPP TSG-CT3 Meeting #114e, C3-211176, Ericsson, Feb. 24-Mar. 5, 2021, 85 pages.
"Correction to TSN configuration call flows to include NEF", SA WG2 Meeting #S2-138E, S2-2002672, Intel, Apr. 20-24, 2020, 28 pages.
"3rd Generation Partnership Project; Technical Specification Group Services and System Aspects; System architecture for the 5G System (5GS); Stage 2 (Release 17)", 3GPP TS 23.501, V17.0.0, Mar. 2021, pp. 1-489.
"3rd Generation Partnership Project; Technical Specification Group Services and System Aspects; Procedures for the 5G System (5GS); Stage 2 (Release 17)", 3GPP TS 23.502, V17.0.0, Mar. 2021, pp. 1-646.
"3rd Generation Partnership Project; Technical Specification Group Services and System Aspects; Policy and charging control framework for the 5G System (5GS); Stage 2 (Release 17)", 33GPP TS 23.503, V17.0.0, Mar. 2021, pp. 1-128.
Notice of Allowance received for corresponding European Patent Application No. 22171720.0, dated Apr. 3, 2025, 7 pages.
Office action received for corresponding Chinese Patent Application No. 202210482293.6, dated Dec. 27, 2024, 8 pages of office action and 5 pages of translation available.
Office action received for corresponding Chinese Patent Application No. 202210482293.6, dated Jul. 29, 2025, 4 pages of office action and 4 pages of translation available.

* cited by examiner

TIME SENSITIVE COMMUNICATION QUALITY OF SERVICE ALTERNATIVES

TECHNOLOGICAL FIELD

The subject matter described herein relates to wireless communications, and more particularly, to managing quality of service requests in a wireless network.

BACKGROUND

Telecommunication networks, such as the fifth generation of mobile networks (5G networks), bring many improvements in mobile network user experience. For instance, 5G networks provide new technical solutions allowing a greater throughput, lower latency, higher reliability, higher connectivity and higher mobility range. In addition to these improvements in terms of performance, 5G networks are also expected to extend the flexibility in the network usage and to provide users with a wider range of use cases and business models.

The $3^{rd}$ Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards.

In wireless telecommunication networks, quality of service (QoS) is the description or measurement of the overall performance of the wireless telecommunication service, particularly the performance seen by users of the network. Additionally, QoS may refer to traffic prioritization and resource reservation control mechanisms and define the ability to provide different priority to different applications, users, and/or data flows, and/or to guarantee a certain level of performance to a data flow.

Under current 3GPP standards, recent contributions include improvements for specifying precise parameters for time sensitive communication (TSC) including preferred QoS parameters. However, the process for specifying parameters for TSC may result in the transmission of numerous requests and unnecessary burden on the network of a 5G system (5GS).

BRIEF SUMMARY

Methods, apparatuses, and computer program products described herein provide for an AF to specify, in QoS requests, alternative QoS-related parameter sets and/or alternative traffic pattern parameter sets. Technical benefits of certain embodiments may include one or more of a reduction in signaling overhead, increased network bandwidth and less processing consumption at a user device and/or network by limiting unnecessary request generation and/or transmissions.

In one aspect, a method is provided that includes receiving, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets. The method also includes selecting, by the PCF, the one or more QoS parameters or an alternative QoS parameter set of the one or more alternative QoS parameter sets based on a supporting capability of a network. The method also includes determining, by the PCF, a Policy and Charging Control (PCC) rule based on the selected one or more QoS parameters or the selected alternative QoS parameter set. The method also includes causing, by the PCF, transmission of the PCC rule to a Session Management Function (SMF). The method further includes causing, by the PCF, transmission of an indication of the selected one or more QoS parameters or the selected alternative QoS parameter set.

In some embodiments, the method also includes selecting, by the PCF, the one or more traffic pattern parameters or an alternative traffic pattern parameter set of the one or more alternative traffic pattern parameter sets based on the supporting capability of the network. In some embodiments, the method also includes causing, by the PCF, transmission of the selected one or more traffic pattern parameters or the selected alternative traffic pattern parameter set to the SMF. In some embodiments, the method also includes causing, by the PCF, transmission of an indication of the selected one or more traffic pattern parameters or the selected alternative traffic pattern parameter set.

In some embodiments of the method, the QoS request is received at the PCF from a Network Exposure Function (NEF) upon authorization of the QoS request or from an Application Function (AF).

In some embodiments of the method, the indication of the selected one or more QoS parameters or the selected alternative QoS parameter set is caused to be transmitted to the NEF.

In some embodiments, the method also includes causing, by the NEF, transmission of the indication of the selected one or more QoS parameters or the selected alternative QoS parameter set to the AF.

In another embodiment, an apparatus is provided that includes at least one processor and at least one memory including computer program code with the at least one memory and the computer program code being configured to, with the at least one processor, cause the apparatus to receive, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets. The at least one memory and the computer program code are also configured to, with the at least one processor, cause the apparatus to select, by the PCF, the one or more QoS parameters or an alternative QoS parameter set of the one or more alternative QoS parameter sets based on a supporting capability of a network.

The at least one memory and the computer program code are also configured to, with the at least one processor, cause the apparatus to determine, by the PCF, a Policy and Charging Control (PCC) rule based on the selected one or more QoS parameters or the selected alternative QoS parameter set. The at least one memory and the computer program code are also configured to, with the at least one processor, cause the apparatus to cause, by the PCF, transmission of the PCC rule to a Session Management Function (SMF). The at least one memory and the computer program code are also configured to, with the at least one processor, cause the apparatus to cause, by the PCF, transmission of an indication of the selected one or more QoS parameters or the selected alternative QoS parameter set.

In some embodiments, the at least one memory and the computer program code are further configured to, with the at least one processor, cause the apparatus to select, by the PCF, the one or more traffic pattern parameters or an alternative traffic pattern parameter set of the one or more alternative traffic pattern parameter sets based on the supporting capability of the network. In some embodiments, the at least one memory and the computer program code are further configured to, with the at least one processor, cause the apparatus to cause, by the PCF, transmission of the selected one or more traffic pattern parameters or the selected alternative traffic pattern parameter set to the SMF. In some embodiments, the at least one memory and the computer program code are further configured to, with the at least one processor, cause the apparatus to cause, by the PCF, transmission of an indication of the selected one or more traffic pattern parameters or the selected alternative traffic pattern parameter set.

In some embodiments of the apparatus, the QoS request is received at the PCF from a Network Exposure Function (NEF) upon authorization of the QoS request or from an Application Function (AF).

In some embodiments of the apparatus, the indication of the selected one or more QoS parameters or the selected alternative QoS parameter set is caused to be transmitted to the NEF.

In some embodiments, the at least one memory and the computer program code are further configured to, with the at least one processor, cause the apparatus to cause, by the NEF, transmission of the indication of the selected one or more QoS parameters or the selected alternative QoS parameter set to the AF.

In another embodiment, an apparatus is provided that includes means for receiving, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets. The apparatus also includes means for selecting, by the PCF, the one or more QoS parameters or an alternative QoS parameter set of the one or more alternative QoS parameter sets based on a supporting capability of a network. The apparatus also includes means for determining, by the PCF, a Policy and Charging Control (PCC) rule based on the selected one or more QoS parameters or the selected alternative QoS parameter set. The apparatus also includes means for causing, by the PCF, transmission of the PCC rule to a Session Management Function (SMF). The apparatus also includes means for causing, by the PCF, transmission of an indication of the selected one or more QoS parameters or the selected alternative QoS parameter set.

In some embodiments, the apparatus also includes means for selecting, by the PCF, the one or more traffic pattern parameters or an alternative traffic pattern parameter set of the one or more alternative traffic pattern parameter sets based on the supporting capability of the network. In some embodiments, the apparatus also includes means for causing, by the PCF, transmission of the selected one or more traffic pattern parameters or the selected alternative traffic pattern parameter set to the SMF. In some embodiments, the apparatus also includes means for causing, by the PCF, transmission of an indication of the selected one or more traffic pattern parameters or the selected alternative traffic pattern parameter set.

In some embodiments of the apparatus, the QoS request is received at the PCF from a Network Exposure Function (NEF) upon authorization of the QoS request or from an Application Function (AF).

In some embodiments of the apparatus, the indication of the selected one or more QoS parameters or the selected alternative QoS parameter set is caused to be transmitted to the NEF.

In some embodiments, the apparatus also includes means for causing, by the NEF, transmission of the indication of the selected one or more QoS parameters or the selected alternative QoS parameter set to the AF.

In another embodiment, a computer program product is provided that includes a non-transitory computer readable storage medium having program code portions stored thereon with the program code portions being configured, upon execution, to receive, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets. The program code portions are also configured, upon execution, to select, by the PCF, the one or more QoS parameters or an alternative QoS parameter set of the one or more alternative QoS parameter sets based on a supporting capability of a network. The program code portions are also configured, upon execution, to determine, by the PCF, a Policy and Charging Control (PCC) rule based on the selected one or more QoS parameters or the selected alternative QoS parameter set. The program code portions are also configured, upon execution, to cause, by the PCF, transmission of the PCC rule to a Session Management Function (SMF). The program code portions are also configured, upon execution, to cause, by the PCF, transmission of an indication of the selected one or more QoS parameters or the selected alternative QoS parameter set.

In some embodiments, the program code portions are further configured, upon execution, to select, by the PCF, the one or more traffic pattern parameters or an alternative traffic pattern parameter set of the one or more alternative traffic pattern parameter sets based on the supporting capability of the network. In some embodiments, the program code portions are further configured, upon execution, to cause, by the PCF, transmission of the selected one or more traffic pattern parameters or the selected alternative traffic pattern parameter set to the SMF. In some embodiments, the program code portions are further configured, upon execution, to cause, by the PCF, transmission of an indication of the selected one or more traffic pattern parameters or the selected alternative traffic pattern parameter set.

In some embodiments of the computer program product, the QoS request is received at the PCF from a Network Exposure Function (NEF) upon authorization of the QoS request or from an Application Function (AF).

In some embodiments of the computer program product, the indication of the selected one or more QoS parameters or the selected alternative QoS parameter set is caused to be transmitted to the NEF.

In some embodiments, the program code portions are further configured, upon execution, to cause, by the NEF, transmission of the indication of the selected one or more QoS parameters or the selected alternative QoS parameter set to the AF.

In another embodiment, a method is provided that includes receiving, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets for a respective QoS reference specified in alternative service requirements of an Application Function (AF). The method also includes determining, by the PCF, alternative QoS parameters for each QoS reference based on the one or more alternative QoS parameter sets for the respective QoS reference. The method also includes determining, by the PCF, a Policy and Charging Control (PCC) rule based on the determined alternative QoS parameters for the respective QoS reference. The method also includes causing, by the PCF, transmission of the PCC rule to a Session Management Function (SMF) to establish alternative QoS profiles.

In some embodiments, the method also includes causing, by the PCF, transmission of an indication of success to a Network Exposure Function (NEF) or the AF.

In some embodiments, the method also includes causing, by the PCF, transmission of the one or more traffic pattern parameters and the one and more alternative traffic pattern parameter sets to the SMF to facilitate a determination of time sensitive communication assistance information (TSCAI) and alternative TSCAI based at least on the one or more traffic pattern parameters and the one and more alternative traffic pattern parameter sets.

In some embodiments, the method also includes subscribing, by the PCF, to notifications of at least one of QoS profile changes and TSCAI changes. In some embodiments, the method also includes receiving a notification of a change to an alternative QoS profile by a Radio Access Network (RAN). In some embodiments, the method also includes causing transmission of the notification to the AF.

In some embodiments of the method, the notification is received and caused to be transmitted by at least one of the PCF and the NEF.

In another embodiment an apparatus is provided that includes at least one processor and at least one memory including computer program code with the at least one memory and the computer program code being configured to, with the at least one processor, cause the apparatus to receive, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets for a respective QoS reference specified in alternative service requirements of an Application Function (AF). The at least one memory and the computer program code are also configured to, with the at least one processor, cause the apparatus to determine, by the PCF, alternative QoS parameters for the respective QoS reference based on the one or more alternative QoS parameter sets for the respective QoS reference. The at least one memory and the computer program code are also configured to, with the at least one processor, cause the apparatus to determine, by the PCF, a Policy and Charging Control (PCC) rule based on the determined alternative QoS parameters for the respective QoS reference. The at least one memory and the computer program code are also configured to, with the at least one processor, cause the apparatus to cause, by the PCF, transmission of the PCC rule to a Session Management Function (SMF) to establish alternative QoS profiles.

In some embodiments, the at least one memory and the computer program code are further configured to, with the at least one processor, cause the apparatus to cause, by the PCF, transmission of an indication of success to a Network Exposure Function (NEF) or the AF.

In some embodiments, the at least one memory and the computer program code are further configured to, with the at least one processor, cause the apparatus to cause, by the PCF, transmission of the one or more traffic pattern parameters and the one and more alternative traffic pattern parameter sets to the SMF to facilitate a determination of time sensitive communication assistance information (TSCAI) and alternative TSCAI based at least on the one or more traffic pattern parameters and the one and more alternative traffic pattern parameter sets.

In some embodiments, the at least one memory and the computer program code are further configured to, with the at least one processor, cause the apparatus to subscribe, by the PCF, to notifications of at least one of QoS profile changes and TSCAI changes. In some embodiments, the at least one memory and the computer program code are further configured to, with the at least one processor, cause the apparatus to receive a notification of a change to an alternative QoS profile by a Radio Access Network (RAN). In some embodiments, the at least one memory and the computer program code are further configured to, with the at least one processor, cause the apparatus to cause transmission of the notification to the AF.

In some embodiments of the apparatus, the notification is received and caused to be transmitted by at least one of the PCF and the NEF.

In another embodiment, an apparatus is provided that includes means for receiving, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets for a respective QoS reference specified in alternative service requirements of an Application Function (AF). The apparatus also includes means for determining, by the PCF, alternative QoS parameters for the respective QoS reference based on the one or more alternative QoS parameter sets for the respective QoS reference. The apparatus also includes means for determining, by the PCF, a Policy and Charging Control (PCC) rule based on the determined alternative QoS parameters for the respective QoS reference. The apparatus also includes means for causing, by the PCF, transmission of the PCC rule to a Session Management Function (SMF) to establish alternative QoS profiles.

In some embodiments, the apparatus also includes means for causing, by the PCF, transmission of an indication of success to a Network Exposure Function (NEF) or the AF.

In some embodiments, the apparatus also includes means for causing, by the PCF, transmission of the one or more traffic pattern parameters and the one and more alternative traffic pattern parameter sets to the SMF to facilitate a determination of time sensitive communication assistance information (TSCAI) and alternative TSCAI based at least on the one or more traffic pattern parameters and the one and more alternative traffic pattern parameter sets.

In some embodiments, the apparatus also includes means for subscribing, by the PCF, to notifications of at least one of QoS profile changes and TSCAI changes. In some embodiments, the apparatus also includes means for receiving a notification of a change to an alternative QoS profile by a Radio Access Network (RAN). In some embodiments, the apparatus also includes means for causing transmission of the notification to the AF.

In some embodiments of the apparatus, the notification is received and caused to be transmitted by at least one of the PCF and the NEF.

In another embodiment, a computer program product is provided that includes a non-transitory computer readable storage medium having program code portions stored thereon with the program code portions being configured, upon execution, to receive, at a Policy Control Function (PCF), a QoS request. The QoS request comprises at least one of one or more QoS parameters and one or more traffic pattern parameters, and at least one of one or more alternative QoS parameter sets and one and more alternative traffic pattern parameter sets for a respective QoS reference specified in alternative service requirements of an Application Function (AF). The program code portions are also configured, upon execution, to determine, by the PCF, alternative QoS parameters for the respective QoS reference based on the one or more alternative QoS parameter sets for the respective QoS reference. The program code portions are also configured, upon execution, to determine, by the PCF, a Policy and Charging Control (PCC) rule based on the determined alternative QoS parameters for the respective QoS reference. The program code portions are also configured, upon execution, to transmit, by the PCF, the PCC rule to a Session Management Function (SMF) to establish alternative QoS profiles.

In some embodiments, the program code portions are further configured, upon execution, to cause, by the PCF, transmission of an indication of success to a Network Exposure Function (NEF) or the AF.

In some embodiments, the program code portions are further configured, upon execution, to cause, by the PCF, transmission of the one or more traffic pattern parameters and the one and more alternative traffic pattern parameter sets to the SMF to facilitate a determination of time sensitive communication assistance information (TSCAI) and alternative TSCAI based at least on the one or more traffic pattern parameters and the one and more alternative traffic pattern parameter sets.

In some embodiments, the program code portions are further configured, upon execution, to subscribe, by the PCF, to notifications of at least one of QoS profile changes and TSCAI changes. In some embodiments, the program code portions are further configured, upon execution, to receive a notification of a change to an alternative QoS profile by a Radio Access Network (RAN). In some embodiments, the program code portions are further configured, upon execution, to cause transmission of the notification to the AF.

In some embodiments of the computer program product, the notification is received and caused to be transmitted by at least one of the PCF and the NEF.

BRIEF DESCRIPTION OF THE DRAWINGS

Figure 1:
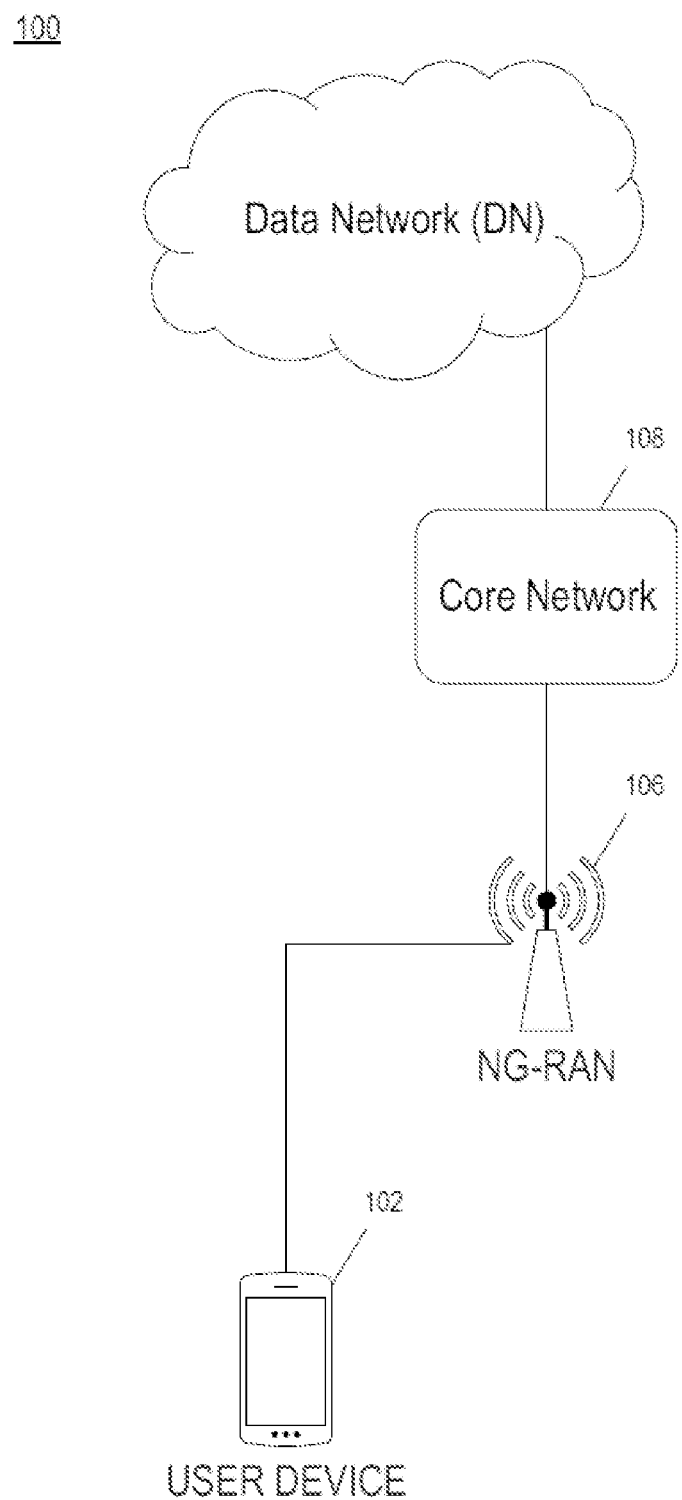
Figure 2:
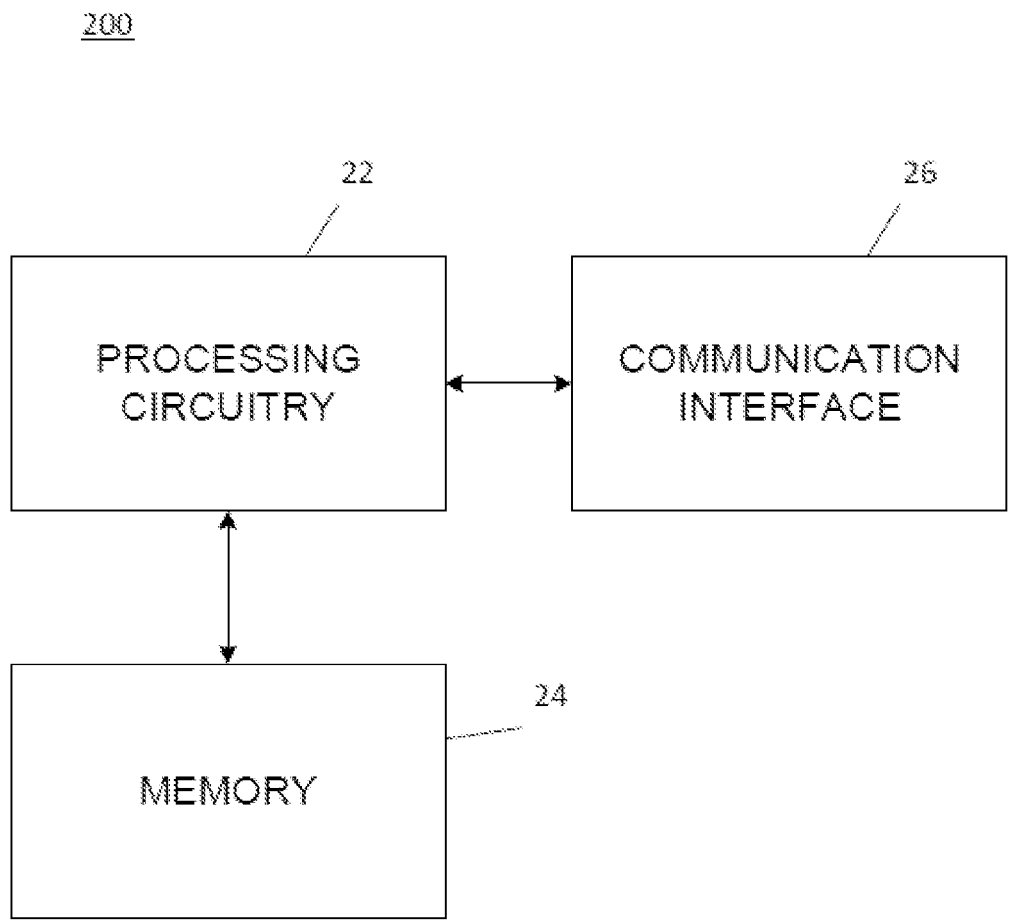
Figure 3A:
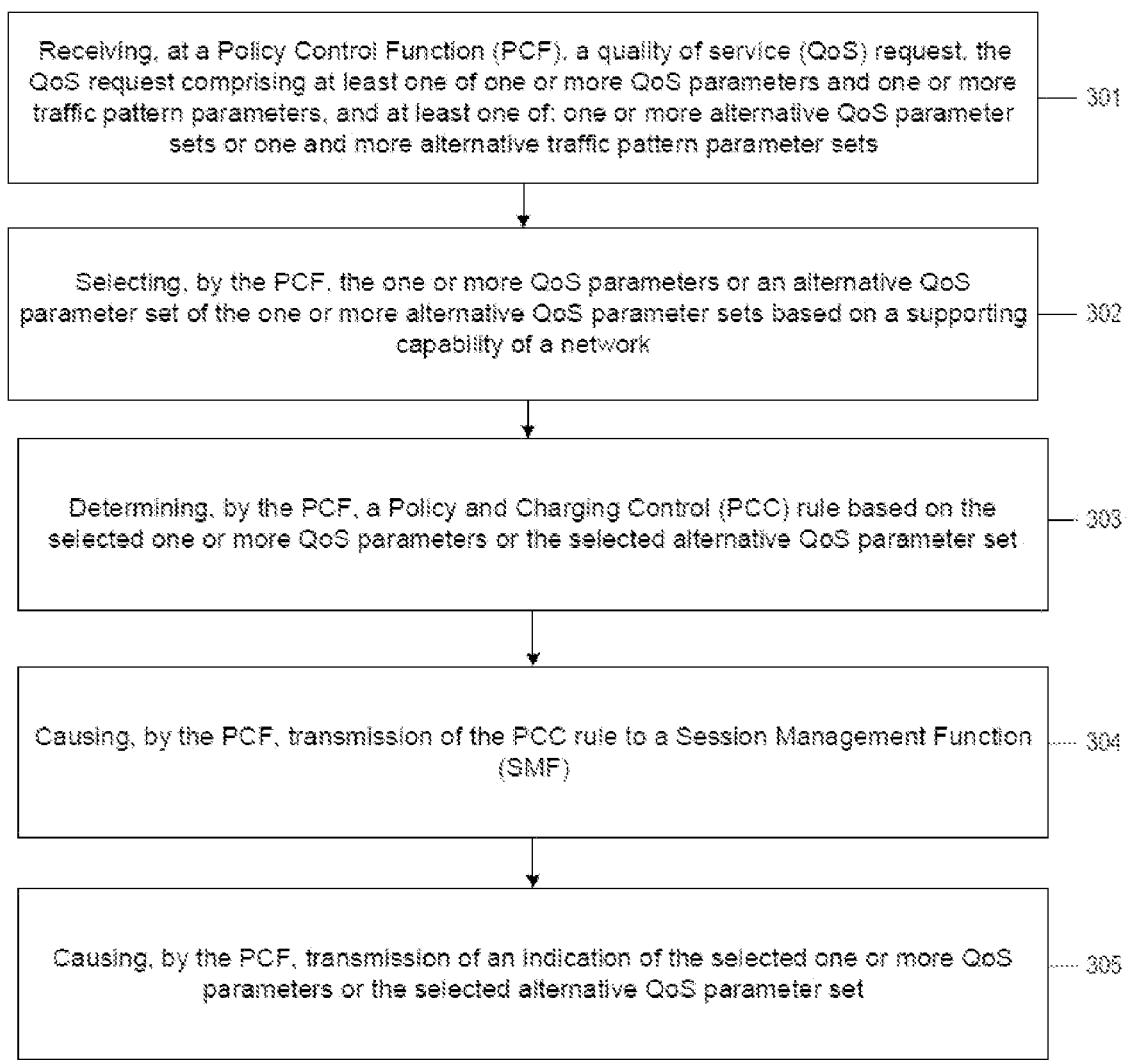
Figure 3B:
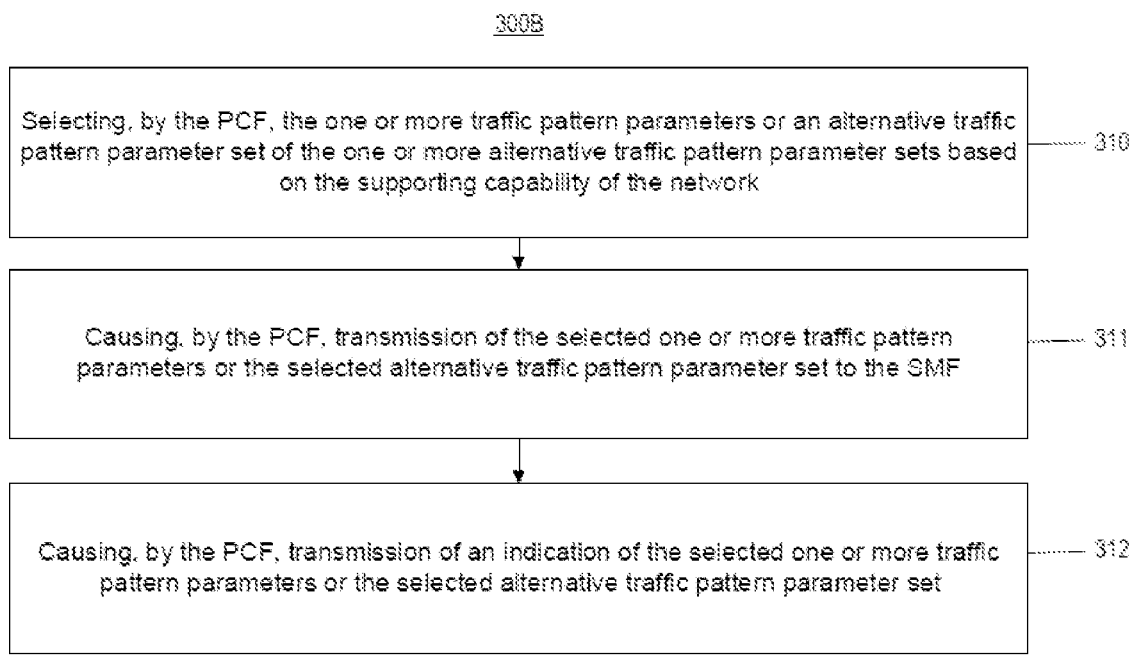
Figure 3C:
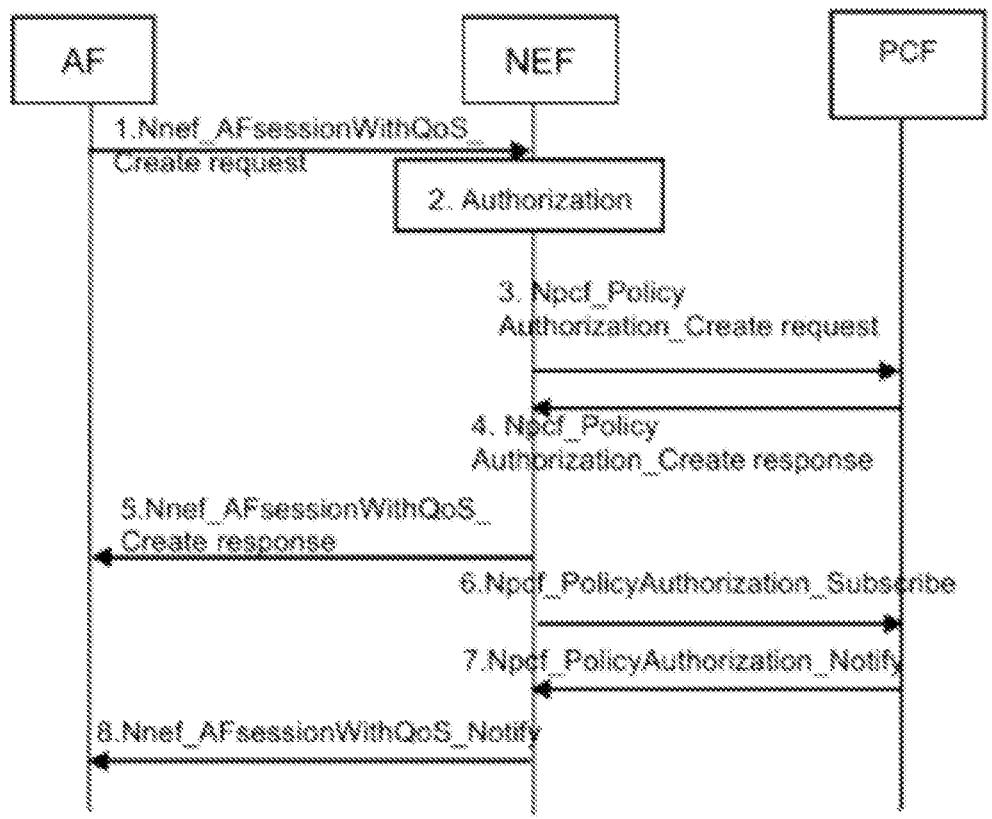
Figure 4A:
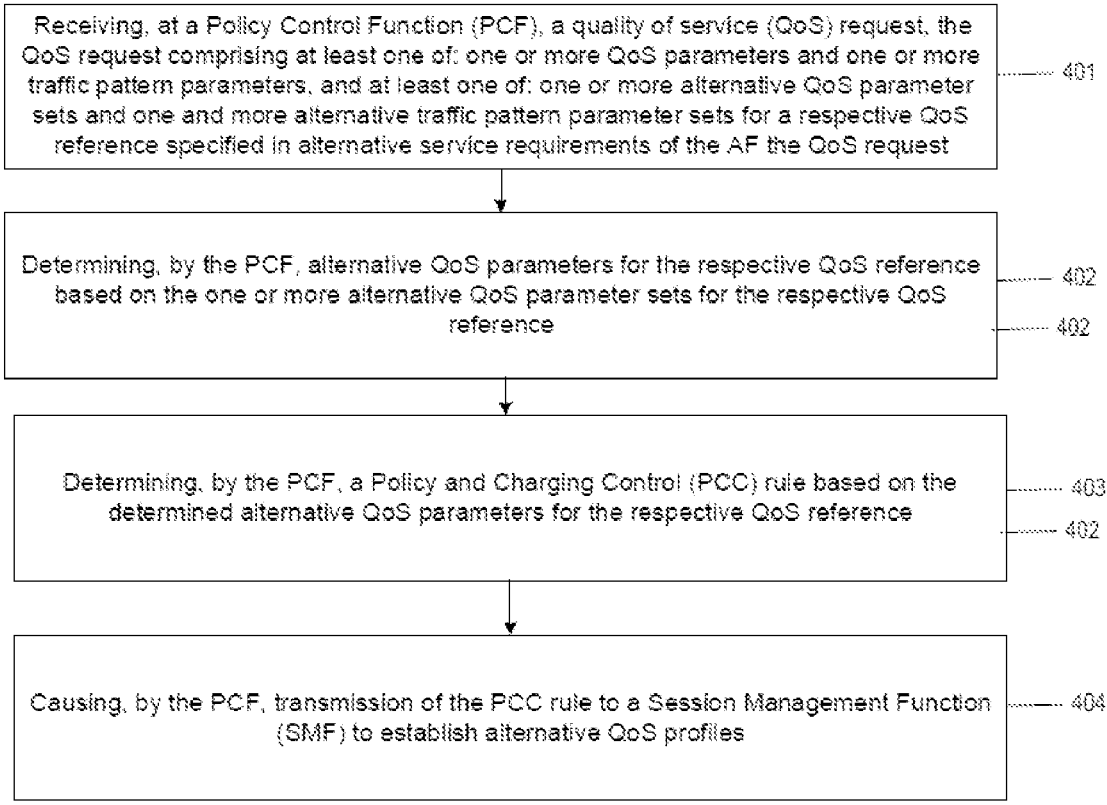
Figure 4B:
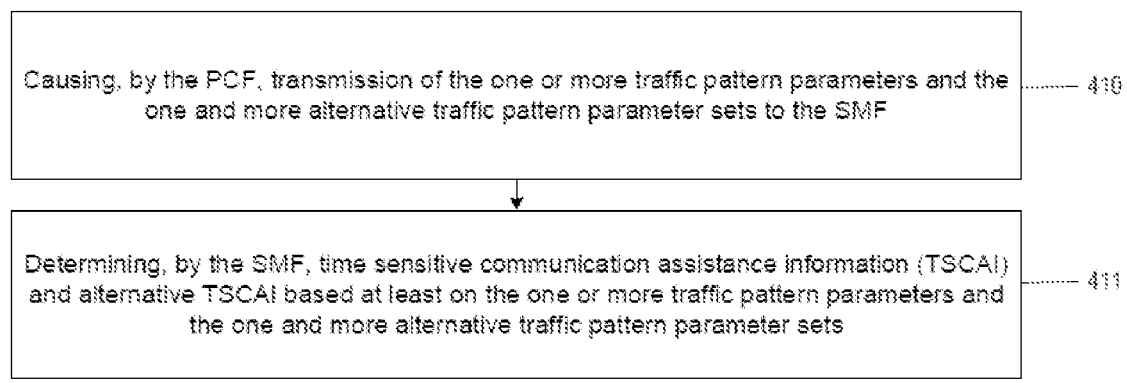
Figure 4C:
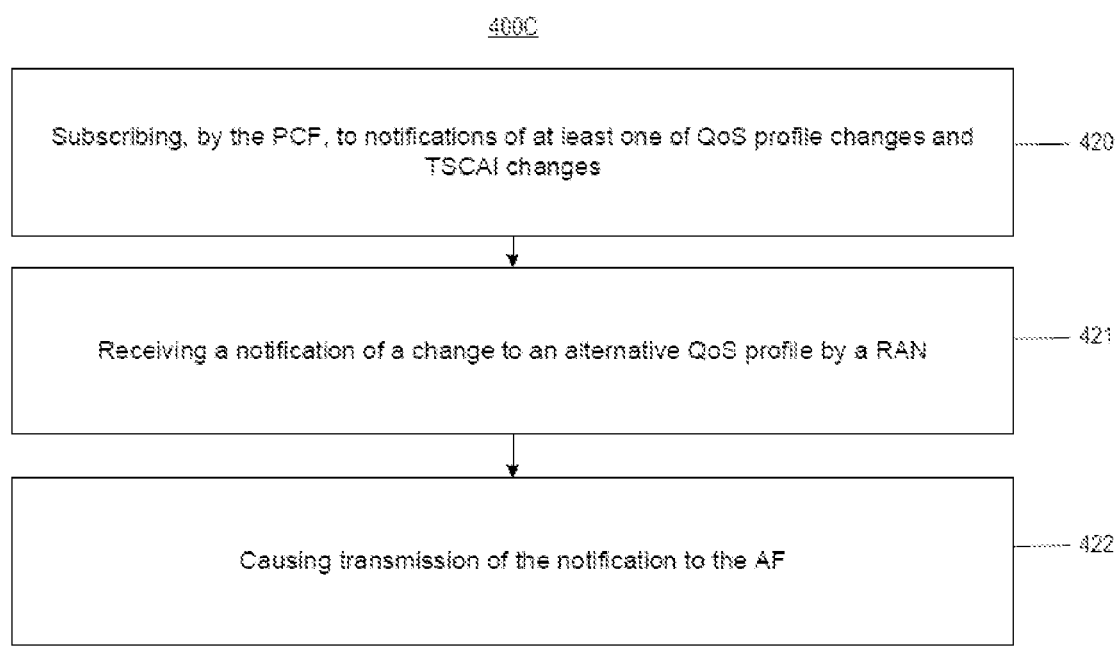
Figure 4D:
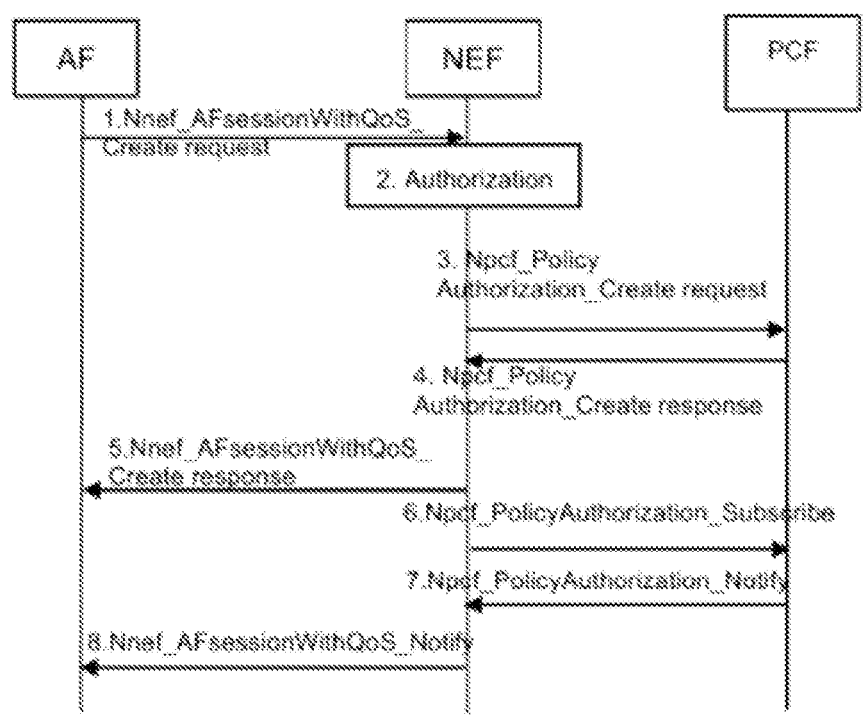

Having thus described certain example embodiments of the present disclosure in general terms, reference will hereinafter be made to the accompanying drawings, which are not necessarily drawn to scale, and wherein:

FIG. 1 is a block diagram of an example network configuration in accordance with an embodiment of the present disclosure;

FIG. 2 is a block diagram of an apparatus that may be specifically configured in accordance with an example embodiment of the present disclosure;

FIG. 3A is a flow chart illustrating example operations performed in accordance with an example embodiment;

FIG. 3B is a flow chart illustrating example operations performed in accordance with an example embodiment;

FIG. 3C is a signal diagram illustrating the operations of FIGS. 3A and 3B, in accordance with an example embodiment;

FIG. 4A is a flow chart illustrating example operations performed in accordance with an example embodiment;

FIG. 4B is a flow chart illustrating example operations performed in accordance with an example embodiment;

FIG. 4C is a flow chart illustrating example operations performed in accordance with an example embodiment; and FIG. 4D is a signal diagram illustrating the operations of FIGS. 4A-C, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Additionally, as used herein, the term 'module' refers to hardware or a combination of hardware and software in which the execution of the software directs operation of the hardware.

Overview

Prior to 3GPP release 17, an Application Function could request Quality of Service (QoS) from a 5G system (5GS) by specifying a QoS reference parameter that referred to predefined QoS information via a request transmitted to a Network Exposure Function (NEF) and/or Policy Control Function (PCF). Additionally, the AF could specify Alternative Service Requirements comprising one or more additional QoS reference parameters in a prioritized order. The PCF could then formulate a PCC rule which is then sent to a Session Management Function (SMF). The PCC rule comprises QoS parameters determined by a QoS Reference. If Alternative Service Requirements (e.g., alternative QoS References) are also provided, the PCF may also include alternative QoS parameter sets in the PCC rule.

The SMF then uses the PCC rule to determine the QoS profile to send to the NG-RAN (Next Generation Radio Access Network). If the PCC rule contains alternative QoS parameter sets, the SMF also sends alternative QoS Profiles to the NG-RAN. If the NG-RAN determines that the guaranteed flow bit rate (GFBR), the packet delay budget (PDB), or the packet error rate (PER) of the QoS profile cannot be fulfilled, the NG-RAN may instead use an alternative QoS profile (selected in priority order) and send a notification to the SMF and optionally, the PCF. The SMF may also inform the user equipment (UE), such as a mobile phone or other client device, about the QoS parameters (e.g., 5G QoS Identifier (5QI), GFBR, maximum flow bit rate (MFBR) corresponding to the alternative QoS profile.

In Release 17, Exposure for Periodic Deterministic QoS has been introduced (e.g., TS23.502 clause 4.15.6.6 and 4.15.6.6a) into the 3GPP standard (incorporated herein by reference). These new capabilities make it possible for an AF requiring time sensitive communication (TSC) to specify certain QoS related parameters and traffic pattern parameters, rather than just a QOS reference in the request for QoS. Specifically, the AF may specify Requested 5GS Delay, Requested GFBR, Requested MFBR, flow direction, and optionally Burst Size, Burst Arrival Time at UE (uplink) or UPF (downlink), Periodicity, and/or Time Domain.

While these new parameters and traffic characteristics introduced to the 3GPP standard in Release 17 enable the AF to more easily specify precise parameters for TSC, they do not allow the AF to specify a set of alternative parameters and traffic characteristics that may also be acceptable to the AF, if preferred parameters and traffic characteristics are unavailable. This limitation presents a significant problem, as the AF is unaware, prior to requesting QoS, as to what the 5GS is able to support. As one example, in a situation wherein the application is a new robot or controller and TSC is needed, the AF knows the overall delay budget is 3 milliseconds (ms) between endpoints. The AF then needs to guess as to the delay that can be requested of the 5GS. For example, the AF may send a QoS request asking for 1 ms, which gets rejected. The AF then guesses again, and sends a QoS request for 1.2 ms, which also gets rejected. The AF may then increment the requested time by 0.2 ms and sequentially send another 10 requests to the 5GS before the request is finally accepted (e.g., at 2.2 ms), thus causing numerous requests to be transmitted and unnecessary burden on the device and/or the network.

By way of an example of a system in which the method and apparatus of an example embodiment may be deployed, FIG. 1 depicts an example of a portion of a 5G wireless network 100 deployed in accordance with some example embodiments. The 5G wireless network 100 may include user equipment (UE), such as a user device 102, configured to wirelessly couple (e.g., via an air interface) to a radio access network (RAN) being served by a wireless access point, such as a base station 106, wireless local area network access point, home base station, and/or other type of wireless access point. While certain embodiments described herein relate to 5G networks, it is to be appreciated that networks other than 5G networks may be used.

The network 100 may include the core network 108, which may include a core access and mobility management function (AMF). The AMF may be used for various network tasks such as registration management, connection management, reachability management, mobility management, and/or other various functions relating to security and access management and authorization. The network 100 and/or core network may further include features such as a session management function (SMF). The SMF may be used for various responsibilities such as, for example, creating, updating, and/or removing Protocol Data Unit (PDU) sessions and managing session context with the User Plane Function (UPF) of the network. The SMF may also use the non-access stratum (NAS), a functional layer used to manage the establishment of communication sessions and to maintain continuous communications with UE, in order to inform the user device of changes in QoS parameters which the RAN may be currently fulfilling.

In some embodiments, the network 100 and/or the core network may include devices having functions supporting a home public land mobile network (HPLMN) and corresponding functions for "home" wireless local area network (WLAN) access, offloading, and/or non-3GPP access. These devices may include a unified data management (UDM) module, a unified data repository, an over-the-air function (OTAF) module, and/or other non-illustrated features such as a Policy Control Function (PCF), Network Exposure Function (NEF) a Home Network Slice Selection Function (NSSF), an Authentication Server Function (AUSF), an Application Function (AF), a Home User Plane Function (H-UPF), and/or a Data Network (DN).

One example of an apparatus 200 that may be configured to function as and/or be embodied by the various functions described above, such as an AF, PCF, NEF, SMF, base station 106, user device 102, and/or the like is depicted in FIG. 2. As shown in FIG. 2, the apparatus includes, is associated with or is in communication with processing circuitry 22, a memory 24 and a communication interface 26. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally, or alternatively, the memory device could be configured to store instructions for execution by the processing circuitry.

The apparatus 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The following example embodiments are associated with configuring and/or setting up an AF Session with required QoS procedures (e.g., 23.502, clause 4.15.6.6 of the 3GPP Standard). Referring now to FIG. 3A-C, example methods 300A, 300B and an example signal diagram illustrating the operations performed by the methods (shown in FIG. 3C) are depicted. In some embodiments, the operations of methods 300A and 300B may be performed by a PCF in circumstances in which Alternative Service Requirements are not specified by the AF (e.g., the AF provides at most one QoS reference in a request to the 5GS), and/or circumstances in which Alternative QoS Profiles (e.g., 23.501 clause 5.7.1.2a) are not supported or not used in the NG-RAN.

As shown in block 301, the apparatus, such as may be embodied by a Policy Control Function (PCF), includes means, such as the processing circuitry 22, the communication interface 26 or the like, for receiving, at the PCF, a QoS request. In this regard, the QoS request comprises at least one of: one or more QoS parameters and one or more traffic pattern parameters, and at least one of: one or more alternative QoS parameter sets and one and more alternative traffic pattern parameter sets.

In some embodiments, the QoS request is received at the PCF from a NEF, the QoS request having been generated by an AF (e.g., as shown in signal 1 of FIG. 3C). In this regard, the apparatus (e.g., when embodied by an AF) includes means, such as the processing circuitry 22, the communication interface 26 or the like, for generating a QoS request comprising at least one of: one or more QoS parameters and one or more traffic pattern parameters, and at least one of: one or more alternative QoS parameter sets and one and more alternative traffic pattern parameter sets and means, such as the processing circuitry, the communication interface or the like, for causing transmission of the QoS request (e.g., to the NEF and/or PCF). In some embodiments, the QoS request is received at the PCF directly from the AF (e.g., without transmission to the NEF). For example, the AF may be a trusted AF such that a NEF is not needed as an intermediary between the AF and PCF for the QoS request.

Once the QoS request is received at the NEF, the NEF may authorize the QoS request and cause transmission of the QoS request to the PCF (e.g., as shown in signal 3 of FIG. 3C). In this regard, the apparatus (e.g., when embodied by a NEF), includes means, such as the processing circuitry 22, the communication interface 26 or the like, for receiving a QoS request comprising at least one of: one or more QoS parameters and one or more traffic pattern parameters, and at least one of: one or more alternative QoS parameter sets and one and more alternative traffic pattern parameter sets, means, such as the processing circuitry or the like, for authorizing the QoS request, and means, such as the processing circuitry, the communication interface or the like, for causing transmission of the QoS request (e.g., to the PCF).

For example, in addition to current QoS parameters and/or traffic pattern parameters, the AF provides, in the QoS request, instances of an alternative QoS related parameters set(s) comprising alternative, less preferred QoS parameters and/or alternative traffic pattern parameter sets comprising alternative, less preferred traffic pattern parameters (e.g., Survival Time) that the AF is willing to accept. In this regard, when determining the QoS for an application and the contents of a TSC Assistance Container, the 5GS may select an alternative parameter set if the QoS parameters (e.g., the best case) for the corresponding traffic pattern parameters cannot be supported.

At block 302, the apparatus, such as may be embodied by the PCF, includes means, such as the processing circuitry 22, the memory 24 and/or the like, for selecting, by the PCF, the one or more QoS parameters or an alternative QoS parameter set of the one or more alternative QoS parameter sets based on a supporting capability of a network. For example, in some embodiments, the PCF selects either the QoS parameters (e.g., if the QoS parameters can be supported by the 5GS), or, if the QoS parameters cannot be supported by the 5GS, a highest priority alternative QoS parameter set based on the QoS that can be supported by the 5GS.

At block 303, the apparatus, such as may be embodied by the PCF, includes means, such as the processing circuitry 22, the memory 24, and/or the like, for determining, by the PCF, a Policy and Charging Control (PCC) rule based on the selected one or more QoS parameters or the selected alternative QoS parameter set. In this regard, in some embodiments, the PCF selects the QoS parameters to use and generates a PCC rule that comprises the selected QoS parameters to forward to the SMF. At block 304, the apparatus includes means, such as the processing circuitry 22, the communication interface 26, and/or the like, for causing transmission, by the PCF, of the PCC rule to the SMF.

In some embodiments, in addition to selecting the one or more QoS parameters or an alternative QoS parameter set, at block 310 of FIG. 3B, the apparatus, such as may be embodied by the PCF, also includes means, such as the processing circuitry 22, the memory 24, and/or the like, for selecting, by the PCF, the one or more traffic pattern parameters or an alternative traffic pattern parameter set of the one or more alternative traffic pattern parameter sets based on the supporting capability of the network. In this regard, TSC parameters are determined for a TSC Assistance Container to be sent to the SMF by selecting the one or more traffic pattern parameters, or, if those parameters cannot be supported, parameters from a highest priority alternative traffic pattern parameter set which can be supported. As shown in block 311, the apparatus, such as may be embodied by the PCF, includes means, such as the processing circuitry 22, the communication interface 26, and/or the like, for causing, by the PCF, transmission of the selected one or more traffic pattern parameters or the selected alternative traffic pattern parameter set to the SMF.

In some embodiments, the PCF can provide an indication of the QoS and/or Traffic Pattern to be provided. In this regard, at block 312, the apparatus, such as may be embodied by the PCF, includes means, such as the processing circuitry 22, the communication interface 26, and/or the like, for causing, by the PCF, transmission of an indication of the selected one or more traffic pattern parameters or the selected alternative traffic pattern parameter set. Similarly, returning to FIG. 3A, at block 305, the apparatus, such as may be embodied by the PCF, includes means, such as the processing circuitry 22, the communication interface 26, and/or the like, for causing, by the PCF, transmission of an indication of the selected one or more QoS parameters or the selected alternative QoS parameter set.

In some embodiments, the indications are caused to be transmitted to the NEF (e.g., as shown in signal 4 of FIG. 3C), which in turn, responds to the AF with the QoS and/or traffic pattern to be provided (e.g., as shown in signal 5 of FIG. 3C). In this regard, the apparatus (e.g., when embodied by the NEF) includes means, such as the processing circuitry 22, the communication interface 26, and/or the like, for receiving an indication of the selected one or more QoS parameters or the selected alternative QoS parameter set and/or an indication of the selected one or more traffic pattern parameters or the selected alternative traffic pattern parameter set (e.g., from the PCF). Additionally, the apparatus (e.g., when embodied by the NEF) includes means, such as the processing circuitry 22, the communication interface 26, and/or the like, for causing transmission of the indication of the selected one or more QoS parameters or the selected alternative QoS parameter set and/or the indication of the selected one or more traffic pattern parameters or the selected alternative traffic pattern parameter set (e.g., to the AF).

In some embodiments, the NEF may cause transmission of a message to the PCF to subscribe to notifications of QoS profile changes and/or TSCAI changes due to Alternative QoS (e.g., as shown in signal 6 of FIG. 3C). In this regard, the apparatus 200 (e.g., when embodied by an NEF) includes means, such as the processing circuitry 22, the communication interface 26 and/or the like, for causing transmission of a notification subscription message associated with at least one of QoS profile changes and TSCAI changes (e.g., to the PCF).

Upon receiving the notification subscription message, the PCF may then subscribe to receive notifications. In this regard, the apparatus, such as may be embodied by the PCF, includes means, such as the processing circuitry 22, memory 24, the communication interface 26 and/or the like, for subscribing, by the PCF, to notifications of at least one of QoS profile changes and TSCAI changes.

In some embodiments, if the RAN switches to an alternative QoS profile, a notification is sent from the RAN to the PCF. In this regard, the apparatus, such as may be embodied by the PCF, includes means, such as the processing circuitry 22, memory 24, the communication interface 26 and/or the like, for receiving a notification of a change to an alternative QoS profile by a RAN. The apparatus 200, such as may be embodied by the PCF, also includes means, such as the processing circuitry 22, memory 24, the communication interface 26 and/or the like, for causing transmission of the notification to the AF (e.g., as shown in signals 7 and 8 of FIG. 3C). In some embodiments, the notification may be caused to be transmitted to the AF via the NEF (e.g., after the PCF provides the notification to the NEF).

In another embodiment (e.g., in circumstances in which Alternative Service Requirements are specified by the AF), methods 400A-C may be performed, as shown in FIG. 4A-C and further illustrated in the signal diagram of FIG. 4D. As shown in block 401, the apparatus, such as may be embodied by the PCF, includes means, such as the processing circuitry 22, the communication interface 26 or the like, for receiving, at the PCF, a QoS request. In this regard, the QoS request comprises at least one of one or more QoS parameters and one or more traffic pattern parameters, and at least one of one or more alternative QoS parameter sets and one and more alternative traffic pattern parameter sets for a respective (e.g., each) QoS reference specified in Alternative Service Requirements of an AF.

In some embodiments, the QoS request is received at the PCF from a NEF, the QoS request having been generated by the AF. In this regard, the apparatus (e.g., when embodied by an AF) includes means, such as the processing circuitry 22, the communication interface 26 or the like, for generating a QoS request comprising at least one of one or more QoS parameters and one or more traffic pattern parameters, and at least one of one or more alternative QoS parameter sets and one and more alternative traffic pattern parameter sets for the respective (e.g., each) QoS reference based on Alternative Service Requirements of the AF and means, such as the processing circuitry, the communication interface or the like, for causing transmission of the QoS request (e.g., to the NEF, as shown in signal 1 of FIG. 4D).

Once the QoS request is received at the NEF, the NEF may authorize the QoS request and cause transmission of the QoS request to the PCF (e.g., as shown in signals 2 and 3 of FIG. 4D). In this regard, the apparatus (e.g., when embodied by a NEF), includes means, such as the processing circuitry 22, the communication interface 26 or the like, for receiving a QoS request comprising at least one of one or more QoS parameters and one or more traffic pattern parameters, and at least one of one or more alternative QoS parameter sets and one and more alternative traffic pattern parameter sets for each QoS reference based on Alternative Service Requirements of the AF, means, such as the processing circuitry or the like, for authorizing the QoS request, and means, such as the processing circuitry, the communication interface or the like, for causing transmission of the QoS request (e.g., to the PCF).

For example, the AF provides, via the QoS request, an instance of an alternative QoS parameter set and/or an instance of an alternative traffic pattern parameters set for each QoS Reference specified by the AF in the Alternative Service Requirements. The request may also comprise QoS parameters and traffic pattern parameters.

At block 402, the apparatus, such as may be embodied by the PCF, includes means, such as the processing circuitry 22, the memory 24 and/or the like, for determining, by the PCF, alternative QoS parameters for each QoS reference based on the one or more alternative QoS parameter sets for each QoS reference. In this regard, for each tuple (e.g., Alternative Service Requirements QoS reference and alternative QoS parameters set and/or alternative traffic pattern parameter set), alternative QoS parameters are determined. For example, the alternative QoS parameters may be determined and/or defined by using the alternative QoS parameter sets that have been received for each QoS reference.

At block 403, the apparatus, such as may be embodied by the PCF, includes means, such as the processing circuitry 22, the memory 24 and/or the like, for determining, by the PCF, a Policy and Charging Control (PCC) rule based on the determined alternative QoS parameters for each QoS reference. For example, the PCC rule can be determined such that the PCC rule comprises the determined alternative QoS parameters for each QoS reference. For example, the alternative QoS parameters are sent as a PCC rule to the SMF, which in turn establishes alternative QoS profiles in the RAN. In this regard, at block 404, the apparatus includes means, such as the processing circuitry 22, the communication interface 26 and/or the like, for causing, by the PCF, transmission of the PCC rule to a Session Management Function (SMF) to establish alternative QoS profiles.

Additionally, in some embodiments, as shown in method 400B in FIG. 4B, at block 410, the apparatus, such as may be embodied by the PCF, also includes means, such as the processing circuitry 22, the communication interface 26 and/or the like, for causing, by the PCF, transmission of the one or more traffic pattern parameters and the one and more alternative traffic pattern parameter sets to the SMF to facilitate a determination time of sensitive communication assistance information (TSCAI) and alternative TSCAI based at least on the one or more traffic pattern parameters and the one and more alternative traffic pattern parameter sets. In this regard, all instances of the alternative traffic pattern parameter sets are caused to be transmitted, along with the traffic pattern parameters, in a TSC Assistance Container to the SMF.

At block 411, the apparatus (e.g., when embodied by the SMF), includes means, such as the processing circuitry 22, the memory 24 and/or the like, for determining, by the SMF, time sensitive communication assistance information (TSCAI) and alternative TSCAI based at least on the one or more traffic pattern parameters and the one and more alternative traffic pattern parameter sets. In some embodiments, the apparatus (e.g., when embodied by the SMF), includes means, such as the processing circuitry 22, the communication interface 26 and/or the like, for causing transmission of the TSCAI and alternative TSCAI (e.g., to the RAN).

In some embodiments, after performing the operations shown in FIGS. 4A and/or 4B, the PCF may respond to the NEF and/or AF indicating success. In some embodiments, the NEF may then respond to the AF indicating success (e.g., as shown in signals 4 and 5 of FIG. 4D). In this regard, the apparatus, such as may be embodied by the PCF, includes means, such as the processing circuitry 22, the communication interface 26 and/or the like, for causing, by the PCF, transmission of an indication of success to a Network Exposure Function (NEF) or Application Function (AF). Similarly, the apparatus (e.g., when embodied by the NEF), includes means, such as the processing circuitry 22, the communication interface 26 and/or the like, for transmitting, by the PCF, an indication of success to an Application Function (AF).

In some embodiments, the NEF may transmit a message to the PCF to subscribe to notifications of QoS profile changes and/or TSCAI changes due to Alternative QoS (e.g., as shown in signal 6 of FIG. 4D). In this regard, the apparatus 200 (e.g., when embodied by an NEF) includes means, such as the processing circuitry 22, the communication interface 26 and/or the like, for causing transmission of a notification subscription message associated with at least one of QoS profile changes and TSCAI changes (e.g., to the PCF).

Upon receiving the notification subscription message, the PCF may then subscribe to receive notifications. In this regard, as shown in method 400C of FIG. 4C, at block 420, the apparatus, such as may be embodied by the PCF, includes means, such as the processing circuitry 22, memory 24, the communication interface 26 and/or the like, for subscribing, by the PCF, to notifications of at least one of QoS profile changes and TSCAI changes.

In some embodiments, if the RAN switches to an alternative QoS profile and selects a corresponding alternative TSCAI (if available), a notification is sent from the RAN to the PCF. In this regard, at block 421, the apparatus, such as may be embodied by the PCF, includes means, such as the processing circuitry 22, memory 24, the communication interface 26 and/or the like, for receiving a notification of a change to an alternative QoS profile by a RAN. At block 422, the apparatus 200, such as may be embodied by the PCF, includes means, such as the processing circuitry 22, memory 24, the communication interface 26 and/or the like, for causing transmission of the notification to the AF (e.g., as shown in signals 7 and 8 of FIG. 4D). In some embodiments, the notification may be caused to be transmitted to the AF via the NEF (e.g., after the PCF provides the notification to the NEF).

As described above, methods, apparatuses, and computer program products are disclosed to specify, in QoS requests, alternative QoS-related parameter sets and/or alternative traffic pattern parameter sets. Technical benefits of this design include one or more of a reduction in signaling overhead, increased network bandwidth and less processing consumption at a user device and/or network by limiting unnecessary request generation and/or transmissions.

FIGS. 3A, 3B, 4A, 4B, and 4C illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at a Policy Control Function (PCF) of a network, a QoS request, the QoS request comprising: one or more QoS parameters, one or more traffic pattern parameters, one or more alternative QoS parameter sets and one and more alternative traffic pattern parameter sets;
   in an instance the one or more QoS parameters are supported by the network:
      determining, by the PCF, a Policy and Charging Control (PCC) rule based on the one or more QoS parameters; and
      in an instance the one or more traffic pattern parameters are supported by the network:
         causing, by the PCF, transmission of the one or more traffic pattern parameters and the PCC rule determined based on the one or more QoS parameters; and
      in an instance the one or more traffic pattern parameters are not supported by the network:
         selecting, by the PCF, an alternative traffic pattern parameter set of the one or more alternative traffic pattern parameter sets, wherein the alternative traffic parameter set is supported by the network; and
         causing, by the PCF, transmission of the alternative traffic pattern parameter set and the PCC rule determined based on the one or more QoS parameters to a Session Management Function (SMF);
   in an instance the one or more QoS parameters are not supported by the network:
      selecting, by the PCF, from among the one or more alternative QoS parameter sets, a highest priority alternative QoS parameter set supported by the network;
      determining, by the PCF, a Policy and Charging Control (PCC) rule based on the highest priority alternative QoS parameter set supported by the network;
      in an instance the one or more traffic pattern parameters are supported by the network:
      causing, by the PCF, transmission of the one or more traffic parameters and the PCC rule determined based on the highest priority alternative QoS parameter set to the SMF; and
      in an instance that the one or more traffic pattern parameters are not supported by the network:
         selecting, by the PCF, from among the one or more alternative traffic pattern parameter sets, an alternative traffic pattern parameter set supported by the network; and
         causing, by the PCF, transmission of the alternative traffic pattern parameter set and the PCC rule determined based on the highest priority alternative QoS parameter set to the SMF.

2. The method of claim 1, further comprising:
   in the instance the one or more QoS parameters are supported by the network and the one or more traffic pattern parameters are supported by the network, causing, by the PCF, transmission of an indication of transmission of the one or more QoS parameters are selected by the PCF and an indication of transmission of the one or more traffic pattern parameters by the PCF;
   in the instance the one or more QoS parameters are supported by the network and the one or more traffic pattern parameters are not supported by the network, causing, by the PCF, transmission of an indication of transmission of the one or more QoS parameters and an indication of transmission of the one alternative traffic pattern parameter set by the PCF;
   in the instance the one or more QoS parameters are not supported by the network and the one or more traffic pattern parameters are supported by the network, causing, by the PCF, transmission of an indication of transmission of the highest priority alternative QoS parameter set selected by the PCF and an indication of transmission of the one or more traffic pattern parameters are selected by the PCF; and in the instance the one or more QoS parameters are not supported by the network and the one or more traffic pattern parameters are not supported by the network, causing, by the PCF, transmission of an indication of transmission of the highest priority alternative QoS parameter set by the PCF and an indication of transmission of the one alternative traffic pattern parameter set by the PCF.

3. The method of claim 2, wherein the QoS request is received at the PCF from an application function (AF) via a Network Exposure Function (NEF) upon authorization of the QoS request by the NEF, and wherein, when caused to be transmitted, the indication of transmission of the one or more QoS parameters by the PCF, the indication of transmission of the highest priority alternative QoS parameter set by the PCF, the indication of transmission of the one or more traffic pattern parameters by the PCF, and the indication of transmission of the one alternative traffic pattern parameter set by the PCF are caused to be transmitted to the NEF.

4. The method of claim 3, further comprising:
instructing the NEF to transmit to the AF the indication of transmission of the one or more QoS parameters by the PCF, the indication of transmission of the highest priority alternative QoS parameter set by the PCF, the indication of transmission of the one or more traffic patterns by the PCF, and the indication of transmission of the alternative traffic pattern set by the PCF.

5. The apparatus of claim 2, wherein the QoS request is received at the directly from an application function (AF), and wherein the indication of transmission of the one or more QoS parameters are by the PCF, the indication of transmission of the highest priority alternative QoS parameter set by the PCF, the indication of transmission of the one or more traffic patterns are by the PCF, and the indication of transmission of the alternative traffic pattern set by the PCF are caused to be transmitted to the AF.

6. The method of claim 1, wherein the QOS request is received at the PCF from an application function (AF) via a Network Exposure Function (NEF) upon authorization of the QoS request by the NEF or directly from the AF.

7. An apparatus comprising:
at least one processor; and
at least one memory including at least computer program code of a policy control function, the computer program code configured to, when executed by the at least one processor, cause the apparatus to perform operations, the operations comprising:
receiving a QoS request, the QoS request comprising: one or more QoS parameters, and one or more traffic pattern parameters, one or more alternative QoS parameter sets and one and more alternative traffic pattern parameter sets;
in an instance the one or more QoS parameters are supported by the network:
determining a Policy and Charging Control (PCC) rule based on the one or more QoS parameters; and
in an instance the one or more traffic pattern parameters are supported by the network:
causing transmission of the one or more traffic pattern parameters and the PCC rule determined based on the one or more QoS parameters; and
in an instance the one or more traffic pattern parameters are not supported by the network:

selecting an alternative traffic pattern parameter set of the one or more alternative traffic pattern parameter sets, wherein the alternative traffic parameter set is supported by the network; and
causing, transmission of the alternative traffic pattern parameter set and the PCC rule determined based on the one or more QoS parameters to a Session Management Function (SMF);
in an instance the one or more QoS parameters are not supported by the network:
selecting from among the one or more alternative QoS parameter sets, a highest priority alternative QoS parameter set supported by the network;
determining a Policy and Charging Control (PCC) rule based on the highest priority alternative QoS parameter set supported by the network;
in an instance the one or more traffic pattern parameters are supported by the network:
causing transmission of the one or more traffic parameters and the PCC rule determined based on the highest priority alternative QoS parameter set to the SMF; and
in an instance that the one or more traffic pattern parameters are not supported by the network:
selecting from among the one or more alternative traffic pattern parameter sets, an alternative traffic pattern parameter set supported by the network; and
causing transmission the alternative traffic pattern parameter set and the PCC rule determined based on the highest priority alternative QoS parameter set to the SMF.

8. The apparatus of claim 7, wherein the operations further comprise:
in the instance the one or more QoS parameters are supported by the network and the one or more traffic pattern parameters are supported by the network, causing transmission of an indication of transmission of the one or more QoS parameters and an indication of transmission of the one or more traffic pattern parameters;
in the instance the one or more QoS parameters are supported by the network and the one or more traffic pattern parameters are not supported by the network, causing transmission of an indication of transmission of the one or more QoS parameters and an indication of transmission of the one alternative traffic pattern parameter set;
in the instance the one or more QoS parameters are not supported by the network and the one or more traffic pattern parameters are supported by the network, causing transmission of an indication of transmission of the highest priority alternative QoS parameter set and an indication of transmission of the one or more traffic pattern parameters; and
in the instance the one or more QoS parameters are not supported by the network and the one or more traffic pattern parameters are not supported by the network, causing transmission of an indication of transmission of the highest priority alternative QoS parameter set and an indication of transmission of the one alternative traffic pattern parameter set.

9. The apparatus of claim 7, wherein the QoS request is received at the from an application function (AF) via a Network Exposure Function (NEF) upon authorization of the QOS request by the NEF or directly from the AF.

10. The apparatus of claim 7, wherein the QoS request is received from via a Network Exposure Function (NEF) upon authorization of the QoS request by the NEF, and wherein, when caused to be transmitted, the indication of transmission of the one or more QoS parameters, the indication of transmission of the highest priority alternative QoS parameter, the indication of transmission of the one or more traffic pattern parameters, and the indication of transmission of the one alternative traffic pattern set are caused to be transmitted to the NEF.

11. The apparatus of claim 10, wherein the operations further comprise:
   instructing the NEF to transmit to the AF the indication of transmission of the one or more QoS parameters, the indication of transmission of the alternative QoS parameter set, the indication of transmission of the one or more traffic pattern parameters, and the indication of transmission of the one alternative traffic pattern set.

12. The method of claim 7, wherein the QoS request is received at the directly from an application function (AF), and wherein the indication of transmission of the one or more QoS parameters are by the PCF, the indication of transmission of the highest priority alternative QoS parameter set by the PCF, the indication of transmission of the one or more traffic patterns are by the PCF, and the indication of transmission of the alternative traffic pattern set by the PCF are caused to be transmitted to the AF.

* * * * *